US005215050A

United States Patent [19]

[11] Patent Number: 5,215,050

[45] Date of Patent: Jun. 1, 1993

Rückert et al.

[54] METHOD OF PRODUCING A CYLINDER HEAD OF AN INTERNAL COMBUSTION ENGINE

[75] Inventors: Franz Rückert, Ostfildern; Jiri Vlach, Dürnau; Rudolf Reinhardt, Esslingen; Dieter Hahn, Plüderhausen, all of Fed. Rep. of Germany

[73] Assignee: Mercedes-Benz AG, Fed. Rep. of Germany

[21] Appl. No.: 919,221

[22] Filed: Jul. 27, 1992

[30] Foreign Application Priority Data

Jul. 26, 1991 [DE] Fed. Rep. of Germany ....... 4124811

[51] Int. Cl.[5] ........................... F02F 1/24; F02F 1/42; B23K 20/12

[52] U.S. Cl. ................................. 123/193.5; 123/668

[58] Field of Search .................. 123/193.5, 193.3, 668, 123/669, 663, 664; 29/888.06

[56] References Cited

U.S. PATENT DOCUMENTS

| | | | |
|---|---|---|---|
| 2,730,085 | 1/1956 | Brill | 123/41.76 |
| 2,833,264 | 5/1958 | Dailey et al. | 123/668 |
| 3,082,752 | 3/1963 | Thomas | 123/668 |
| 4,341,826 | 7/1982 | Prewo et al. | 123/668 |
| 4,774,926 | 10/1988 | Adams | 123/193.5 |
| 4,838,235 | 6/1989 | Kawamura et al. | 123/668 |
| 4,864,987 | 9/1989 | Kawamura | 123/668 |
| 4,957,081 | 9/1990 | Ito et al. | 123/193.5 |

FOREIGN PATENT DOCUMENTS

| | | |
|---|---|---|
| 0375590 | 6/1990 | European Pat. Off. . |
| 3100755 | 9/1982 | Fed. Rep. of Germany . |
| 0182339 | 9/1985 | Japan . |
| 6910855 | 1/1970 | Netherlands . |

*Primary Examiner*—Willis R. Wolfe
*Assistant Examiner*—M. Macy
*Attorney, Agent, or Firm*—Evenson, McKeown, Edwards & Lenahan

[57] ABSTRACT

A method of producing a cylinder head of an internal combustion engine, comprising a cylinder head housing made of an aluminum material and having a base plate fitted into the combustion-chamber-side base wall of the cylinder head housing and made of a highly heat-resistant material. The combustion chamber plate is connected to the base wall of the cylinder head housing by friction welding.

8 Claims, 1 Drawing Sheet

METHOD OF PRODUCING A CYLINDER HEAD OF AN INTERNAL COMBUSTION ENGINE

BACKGROUND AND SUMMARY OF THE INVENTION

The present invention relates to a method of producing a cylinder head of an internal combustion engine, comprising a cylinder head housing made of an aluminum material and having a combustion chamber plate fitted into the combustion-chamber-side base wall and made of a highly heat-resistant material.

German Patent Document DE-OS 31 00 755 discloses a cylinder head of the generic type defined in the preamble, in which a combustion chamber base made of precipitation hardened aluminum is inserted. The possibility of using a welding process is specified only in principle for the attachment of the combustion chamber base to the cylinder head housing.

The object of the invention, for a cylinder head made of an aluminum material and having a combustion chamber plate fitted in the base wall and made of a highly heat-resistant material, is therefore to provide a simple and inexpensive method to achieve a surface-locking and permanent connection between combustion chamber plate and cylinder head housing.

This object is achieved in a simple manner by the method according to the invention, in which, through the use of the friction welding method, the boundary layer between the base wall and the combustion chamber plate is melted in the cylinder-head area covered by the combustion chamber plate so that the combustion chamber plate penetrates into the cylinder head base due to the simultaneously applied pressure, partly displacing the liquefied material. The permanent welded joint resulting from this process extends, free of pores, to the greatest possible degree over the entire contact surface between the combustion chamber plate and the base wall of the cylinder head.

Other objects, advantages and novel features of the present invention will become apparent from the following detailed description of the invention when considered in conjunction with the accompanying drawings.

DETAILED DESCRIPTION OF THE DRAWINGS

Figure 1:
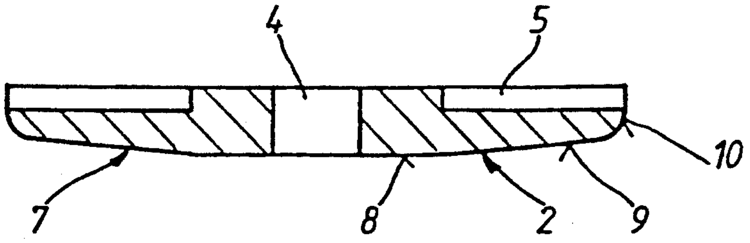
FIG. 1 shows a cross-section of a combustion chamber plate as a cylinder-head-side limit of a combustion chamber (not shown in more detail)
Figure 2:
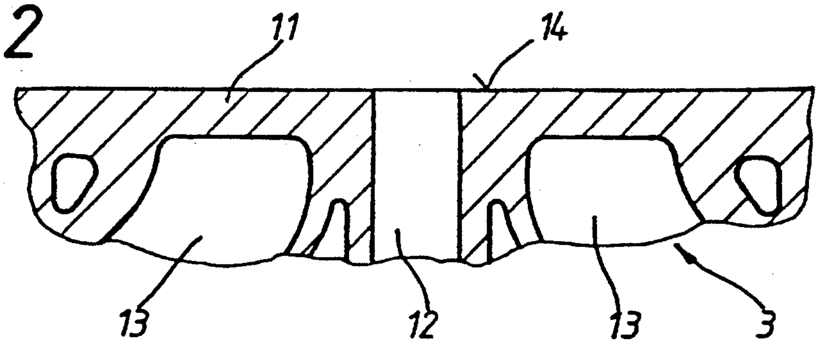
FIG. 2 shows a cross-section of a combustion-chamber-side detail of a cylinder head housing.

The blanks of a combustion chamber plate 2 and a cylinder head housing 3 are shown in FIGS. 1 and 2 as individual parts of a cylinder head 1 before they are joined together.

Figure 5:
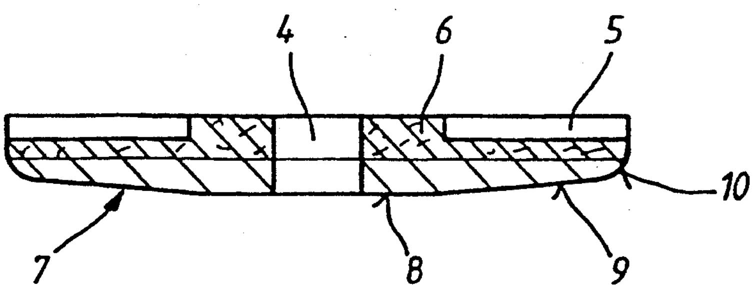
FIG. 5 shows a cross-section of a combustion chamber plate constructed from two material layers.

The combustion chamber plate 2 shown in FIG. 1 has a circular, disc-shaped form in which a central, axially extending passage 4 and, on the combustion-chamber side, radially extending grooves 5 for the engagement of the work fixture of a friction welding machine, are arranged. This special fixture ensures the transmission of the torque required during the friction welding as well as the possibility of welding combustion chambers having a small cylinder spacing next to one another. The thickness of the combustion chamber plate 2 is selected in such a way that the grooves 5 are completely removed during the finish machining of the cylinder head 1. The combustion chamber plate 2 is preferably made of a highly heat-resistant material, e.g., a suitable aluminum material. This material can either be continuous or, as shown in FIG. 5, can be reinforced in a combustion-chamber-side layer 6 by embedded fibers, preferably $Al_2O_3$ fibers. The continuous cylinder-head-side joining surface 7 of the combustion chamber plate 2 consists of a small, central, annular surface 8 which is enclosed by a surface 9 having a slightly tapered or spherical configuration, by means of which the thickness of the combustion chamber plate 2 narrows towards the margin, in which arrangement this surface can be terminated on the outside by a transition radius 10.

The blank of the cylinder head housing 3 is produced in a known manner by casting from an aluminum material is shown in FIG. 2, in which the flat combustion chamber-side base wall 11, a central opening 12 as well as the gas-exchange passages 13 (ending blind at the transition into the base wall 11) can be seen. These blind gas-exchange passages 13 result in a continuous joining surface 14 of the base wall 11.

In the arrangement shown in FIGS. 1 and 2, the joining surface 7 of combustion chamber plate 2 has a slightly tapered or spherical configuration and the joining surface 14 of the base wall 11 is substantially flat. In an alternative arrangement, instead of the joining surface 7 of the combustion chamber plate 2, the joining surface 14 of the base wall 11 (or both joining surfaces 7, 14) can have a slightly tapered or spherical configuration. This design feature, essential for the subsequent joining operation, ensures that, when the combustion chamber plate 2 is in the correct position on the cylinder head housing 3 before the start of the joining operation, only the small, central surface 8 bears directly on the combustion-chamber-side joining surface 14 of the base wall 11 and that, in addition, there is a widening gap between the joining surfaces 7, 14 to be welded as the radial distance from the central passage 4 or opening 12 increases.

The design, shown by way of example, of the combustion chamber plate 2 is only suitable for an essentially flat or slightly arched form of the combustion chamber 15. Further designs of a combustion chamber plate for combustion chambers arched to a deeper extent are possible by a conical, tapered or similar recess being made in the cylinder head housing and by the cylinder-head-side joining surface of the combustion chamber plate being designed in accordance with the recess in the cylinder head housing. Irrespective of the specific form of the combustion chamber, however, the configuration essential for the performance of the friction welding operation, having a small, central contact surface and, beyond the latter, a gap between the joining surfaces which widens as the radial distance from the center increases, must be guaranteed.

The pre-finished cylinder head housing 3 and the combustion chamber plate 2 are joined together by friction welding, in which the combustion chamber plate 2 is rotated and pressed against the fixed cylinder head housing 3 by means of a friction welding device in a known manner. Due to the configuration of the joining surfaces 7, 14, the heating and melting process starts at the small, central surface 8 in the area of direct contact between the joining surfaces 7, 14 directly around the central opening 12 or passage 4, and spreads outwards with increasing friction time. As a result of the applied pressure and the displacing action of the slightly tapered or convex joining surface 7 of the combustion chamber plate 2, a portion of the material melted during the welding operation at the boundary layer between the parts to be welded flows off from inside to outside, and forms the weld upset 16. A further portion of the melted material can also flow off through or into the central opening 12 or passage 4. This melting and flow-off action of the material is continued until the joining surfaces 7, 14 are melted out to the marginal zones of the parts to be welded. Due to the heating and melting from inside to outside, a pore-free welded joint 17 is obtained over the entire joining surface 7, 14, the torque required for the welding operation being relatively small in relation to the size of the joining surfaces 7, 14.

Figure 3:
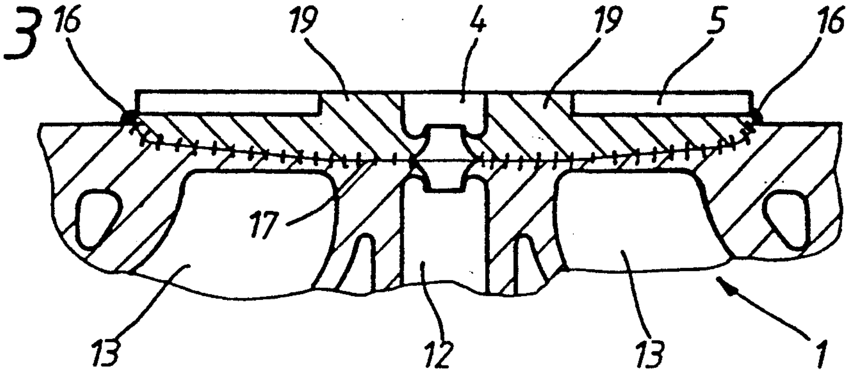
FIG. 3 shows a cross-section of the friction-welded joint between cylinder head housing and combustion chamber plate.
Figure 4:
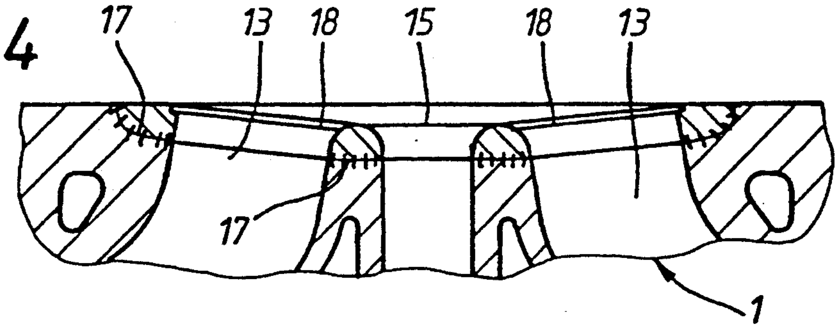
FIG. 4 shows a cross-section of the cylinder head from FIG. 3 in the finish-machined state.

The welding operation is completed by ending the rotary movement and pressing together the parts to be welded in a known manner. The cylinder head 1 shown in FIG. 3 and having the completed welded joint 17 can now be treated further by means of suitable machining processes. To this end, starting from the combustion chamber 15, the connection to the blind gas-exchange channels 13 is produced and finish-machined in accordance with FIG. 4, and the valve seats or the receptacle 18 for the valve seat rings machined in. Subsequently, the projecting length 19 of the combustion chamber plate 2 having the grooves 5 and the weld upset 16 are removed, the combustion chamber 15 is formed and the central opening 12 or passage 4 for accommodating a spark plug or an injection nozzle is bored through and finish-machined.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Method of producing a cylinder head of an internal combustion engine, comprising a cylinder head housing cast from an aluminum material and having gas-exchange channels, and a combustion chamber plate fitted into a combustion-chamber-side base wall of the cylinder head housing and made of a highly heat-resistant material, said method comprising the steps of:

producing the cylinder head housing as a cylinder head blank having gas-exchange channels ending blind at a base wall on a combustion-chamber side thereof;

producing the combustion chamber plate with a closed joining surface;

connecting the combustion chamber plate to the base wall of the cylinder head housing by friction welding; and connecting the combustion chamber and the gas-exchange channels.

2. Method according to claim 1, wherein the friction welding operation starts with a heating and melting phase at a relatively small, central surface section of the combustion chamber plate and a correspondingly small surface section of the base wall of the cylinder head housing and continues with progressive melting of the materials of combustion chamber plate and base wall in the direction of the periphery of the combustion chamber plate.

3. Method according to claim 1, wherein the friction welding operation starts with a heating and melting phase at a relatively small, central surface section of the combustion chamber plate and a correspondingly small surface section of the base wall of the cylinder head housing and continues with progressive melting of the materials of combustion chamber plate and base wall in the direction of the periphery of the combustion chamber plate.

4. Cylinder head for an internal combustion engine comprising a cylinder head housing made of an aluminum material and a combustion chamber plate fitted into a combustion-chamber-side base wall of the cylinder head housing and made of a highly heat-resistant material, which cylinder head is produced friction welding said combustion chamber plate to said cylinder head housing, wherein the combustion chamber plate is made of a highly heat-resistant aluminum material and is reinforced by $Al_2O_3$ fibers.

5. Cylinder head according to claim 5, wherein the combustion chamber plate has on the combustion-chamber side a layer reinforced by $Al_2O_3$ fibers.

6. Cylinder head according to claim wherein pre-finished contours of joining surfaces on the combustion chamber plate and base wall have a relatively small, central surface area as initial contact surfaces of combustion chamber plate and base wall, a gap being formed between the joining surfaces which widens in the direction of the outer periphery of the combustion chamber plate.

7. Cylinder head according to claim 6, wherein the joining surface of the combustion chamber plate consists of a central plane surface which is enclosed by a surface having a tapered or spherical configuration.

8. Cylinder head according to claim 7, wherein the combustion chamber plate has recesses on the combustion-chamber side, preferably grooves for the engagement of the work fixture of a friction welding machine.

* * * * *